United States Patent Office 3,132,213
Patented May 5, 1964

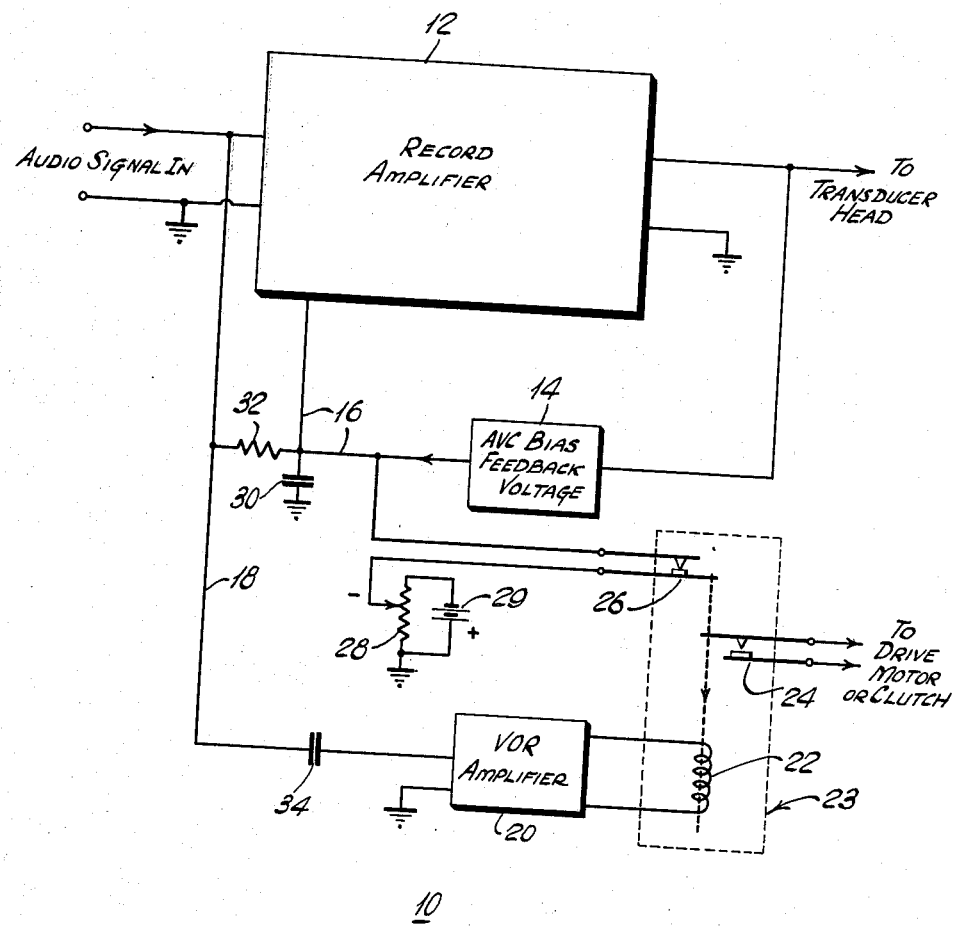

3,132,213
AUTOMATIC VOLUME CONTROL SYSTEM FOR A DICTATING MACHINE AND THE LIKE
Douglas E. Taylor, Westport, and William F. Mitchell, Fairfield, Conn., assignors to Dictaphone Corporation, Bridgeport, Conn., a corporation of New York
Filed Jan. 30, 1961, Ser. No. 85,774
2 Claims. (Cl. 179—100.1)

This invention relates to a system for automatically controlling the volume of an A.C. signal, and more particularly to a system for controlling the signal level in the amplifier of a dictating machine and the like during recording.

An object of this invention is to provide an improved arrangement for automatically controlling the volume or level of a recorded signal.

A more specific object is to eliminate sudden peaks or "bumps" in signal level at the very beginning of each interval of recording in a sound recording machine, such as a dictating machine.

A further object is to provide such an automatic volume control circuit which is simple, reliable, and inexpensive.

In a dictating machine, for example, the level of the sound signal tends to vary in amplitude over a wide dynamic range. But, because of the inherent limitations in recording equipment, it is desirable that the actual electrical signal, corresponding to the original sound, which is applied to the recording head in the machine be kept below some maximum value. This conventionally is done automatically by a suitable automatic volume control circuit, many of which are known in the art.

A typical volume control circuit of this kind operates by monitoring the signal level at the output of the recording amplifier, then developing from this signal a proportional D.C. bias which is fed back to the amplifier to control its gain or amplification. With such an arrangement when the level of the input signal is low, the amplifier will be adjusted to have maximum gain. Accordingly, because of inherent delay in the action of the control circuit, at the first instant of operation if a signal of large amplitude appears at the input, there will occur a momentary burst or peak in the output signal of the amplifier. This is undesirable.

In a dictating machine system to which the invention is particularly applicable, the machine is arranged to be automatically turned on and off during recording by means of a voice-controlled relay. The latter is responsive to sound signals picked up by the machine's microphone so that, when a person begins to talk, the first sound of a word actuates the relay which in turn sets the machine running. When the person stops dictating, the machine will automatically stop and stay stopped until he begins to talk again. With a system of this kind, in order to avoid false starting of the machine by extraneous noise, for example, the voice-operated relay is adjusted to respond only to sounds above a suitable, fairly high level. The relay further has a short time delay in turning off so that a momentary pause in the dictation will not cause the machine to stop. This relay will remain actuated for a short period of time after the signal level drops to a volume less than that needed to start operation. Now, with each turning on of the machine by the voice-operated relay, the signal level then present to be recorded will be relatively large. However, as explained above, at this moment the automatic volume control circuit in the machine normally would have set the gain of the amplifier at its maximum value so that a signal which is sufficient to actuate the voice-operated relay tends at the same moment to cause an instantaneous excessive signal in the amplifier. The present invention overcomes this difficulty and does so in a simple yet very effective way.

In accordance with the present invention, in one specific embodiment thereof, the automatic volume control circuit in a voice-operated dictating machine system is itself controlled so that, when there is no signal, the gain of the recording amplifier is temporarily held at a suitable intermediate level, instead of being permitted to rise to maximum value. Now, when a signal large enough to actuate the voice-operated relay appears, there will be no undesirable peak in the recording signal. After the machine is turned on each time, and the initial transient of starting is over, the volume control circuit is allowed to operate normally to control the recorded signal automatically. Thereafter, when dictating stops and the voice-operated relay drops out and turns the machine off, the gain of the amplifier is once again held at a suitable level independently of the maximum gain permitted by the automatic volume control circuit under low signal conditions.

A better understanding of the invention together with a full appreciation of its many advantages will best be gained from the following description given in connection with the single figure of the drawing, which is a schematic diagram of an automatic volume system embodying features of the invention.

The circuit 10 shown in the drawing includes a record amplifier 12 having an internal automatic volume control circuit for keeping the output signal from the amplifier within desired limits regardless of the input signal level. This amplifier and circuit may, for example, be of the type disclosed in U.S. Patent 2,444,676. Associated with the amplifier is a feedback voltage unit 14 which is connected to the output of the amplifier and which, in known manner, develops a bias signal for controlling the automatic volume control (AVC) circuit in the amplifier. During normal operation of the amplifier, the output of unit 14 is returned to the amplifier via a lead 16.

Operating independently of amplifier 12 but connected in parallel with its audio signal input terminals via a lead 18 is an amplifier 20 whose output actuates the coil 22 of a voice-operated relay (VOR), generally indicated at 23. This relay has a pair of contacts 24, which are open when the relay is not energized, and a pair of contacts 26 which are closed when the relay is not energized. When the input signal exceeds a given level, the relay is energized thereby closing contacts 24 and opening contacts 26.

The closing of contacts 24 turns on a drive motor (not shown) in the recording or dictating machine thereby initiating the recording operation. Simultaneously with the closing of contacts 24, contacts 26 are opened. When this occurs, lead 16 which previously had been shunted through contacts 26 to a potentiometer 28 shunting a battery 29, is disconnected therefrom. This permits the voltage on the lead to rise or fall to the value determined by AVC unit 14, which state continues during the recording operation. However, when the input signal ceases, the voice-operated relay will cease to be energized, as explained above. This stops the motor and also clamps the bias on lead 16 to the value determined by the setting of potentiometer 28 and the size of battery 29. By adjusting the potentiometer, this voltage can be set to a suitable level so that the gain of amplifier 12 under low signal conditions and with contacts 26 closed will be held substantially under the maximum gain normally permitted by unit 14 under low signal conditions during recording.

To prevent sudden transients from affecting the voltage on lead 16, it is bypassed to ground through a filter capacitor 30. Also, lead 18 is shunted by a resistor 32 connected to ground through capacitor 30. Resistor 32 applies the bias voltage on lead 16 to the input of amplifier 12. This voltage is blocked from VOR amplifier 20 by a capacitor 34.

The above description is intended in illustration and not in limitation of the invention. Various changes or modifications in the embodiment set forth may occur to those skilled in the art and these can be made without departing from the spirit or scope of the invention as set forth.

We claim:

1. An automatic volume control arrangement for a dictating machine and the like, said arrangement comprising a recording amplifier, a voice operated relay, means to apply an input audio signal to said amplifier and relay, feedback bias means responsive to the output signal from said amplifier to automatically control the gain thereof, means including a first switch controlled by said relay for initiating a recording operation, and means including a second switch controlled by said relay for clamping the gain of said amplifier at an intermediate value independently of said bias means, whereby when said relay is initially operated the gain of said amplifier will be set to record at a desired level and thereafter this level will be maintained automatically.

2. The arrangement in claim 1 wherein said means for clamping includes an adjustable voltage source.

References Cited in the file of this patent

UNITED STATES PATENTS

| | | |
|---|---|---|
| 2,316,354 | Moritz | Apr. 13, 1943 |
| 2,558,954 | Henson | July 3, 1951 |
| 2,833,866 | Esser | May 6, 1958 |